United States Patent [19]

Lender

[11] 4,406,009
[45] Sep. 20, 1983

[54] METHOD AND APPARATUS FOR CONVERTING BINARY INFORMATION INTO A SINGLE-SIDEBAND 3-LEVEL CORRELATIVE SIGNAL

[75] Inventor: Adam Lender, Palo Alto, Calif.

[73] Assignee: GTE Automatic Electric Incorporated, Northlake, Ill.

[21] Appl. No.: 34,320

[22] Filed: Apr. 30, 1979

[51] Int. Cl.³ .................. H04L 25/34; H04L 27/02
[52] U.S. Cl. ......................... 375/18; 375/39; 375/43
[58] Field of Search .......... 340/347 DD; 325/38 A, 325/49, 50, 60, 137, 138; 179/15 BC; 178/68; 375/17, 43, 61, 18, 20, 39; 455/46, 47, 109

[56] References Cited

U.S. PATENT DOCUMENTS

| | | | |
|---|---|---|---|
| 3,139,615 | 6/1964 | Aaron | 325/38 A |
| 3,588,702 | 6/1971 | Tisi | 325/49 |
| 3,846,583 | 11/1974 | Boulter | 375/43 |
| 3,947,767 | 3/1976 | Koike et al. | 325/38 A |

OTHER PUBLICATIONS

Proceeding of IRE; vol. 44, No. 12, Dec. 1956, pp. 1703–1705 "A Third Method of Generation and Detection of SSB Signals," Donald K. Weaver, Jr.

Primary Examiner—Benedict V. Safourek
Attorney, Agent, or Firm—Leonard R. Cool

[57] ABSTRACT

A transmitter converts an incoming bit stream into a single-sideband signal for transmission over a band-limited channel such as a digital radio. The incoming bit stream is digitally processed to obtain both in-phase and quadrature-phase 3-level correlative signals. The two correlative signals are separately band limited to a passband having a bandwidth that is about one-fourth the bit rate of the original bit stream, and these band-limited signals are then separately analog modulated, respectively, using in-phase and quadrature-phase carrier frequencies which are derived from a carrier oscillator. The products from the analog modulation process are then combined in a summing circuit to derive the single-sideband signal. At the receiver, the single-sideband signal is analog demodulated using a carrier frequency that is at either end of the single-sideband frequency spectrum, i.e., $C \pm 1/4T$ Hz where $C$ is the carrier, frequency in Hz and $1/T$ is the cut-off frequency in Hz and is numerically equal to the bit rate in bits per second (BPS). The lower sideband is selected by a low-pass filter and the signal thus obtained is modified duobinary. By rectifying and slicing the modified duobinary signal the original data is recovered.

28 Claims, 14 Drawing Figures

METHOD AND APPARATUS FOR CONVERTING BINARY INFORMATION INTO A SINGLE-SIDEBAND 3-LEVEL CORRELATIVE SIGNAL

CROSS-REFERENCE TO RELATED APPLICATION

A. Lender and H. H. Olszanski, application Ser. No. 034,321, filed Apr. 30, 1979, entitled "Method And Apparatus For Converting Binary Information Into A High Density Single-Sideband Signal."

BACKGROUND OF THE INVENTION

1. Field of the Invention

This invention relates to the transmission of digital information, and more particularly to the use of correlative level coding techniques in combination with digital processing and analog modulation to generate a single-sideband signal.

2. Background Description

The three basic techniques which may be used in analog modulation processing for the generation of single-sideband signals are well-known. These three basic techniques are described in an article by Donald K. Weaver, Jr., "A third method of generation and detection of single-sideband signals," proceeding of the IRE, Vol. 44, No. 12, December 1956, pages 1703–1705. Such techniques have not been previously applied to digital signals. Memoryless techniques are out of the question for single-sideband signals since they contain dc and most of the energy is concentrated near the low frequency end of the spectrum. To remedy this disadvantage would require elimination of the dc and low frequency at the transmitter plus the use of quantized feedback at the receiver in order to re-introduce the dc and low frequency components. This would require techniques which are too cumbersome and complex for a multi-level waveform.

The modulation techniques which have been employed in digital transmission systems in the prior art are generally referred to as amplitude-shift keying (ASK), phase-shift keying (PSK) often referred to as phase modulation or frequency-shift keying (FSK). None of these digital modulation techniques have been amenable to single-sideband transmission. Because of this, a part of the improvement in bandwidth compression which may be obtained through phase-modulation or correlative level coding techniques is lost since the signal generated for transmission in the prior art systems is in effect double-sideband.

SUMMARY OF THE INVENTION

Method and apparatus for generating a single-sideband signal from a serial bit stream which includes the transformation of the bit stream into separate in-phase and quadrature-phase 3-level correlative signals; separately band limiting the 3-level signals; analog modulating the band limited in-phase and quadrature-phase 3-level correlative signals, respectively, with in-phase and quadrature-phase components of a line carrier frequency; and, summing the analog modulation products to derive the single-sideband signal.

DETAILED DESCRIPTION OF INVENTION

For clarity and simplification of the description, the various processes involved in the generation of the single-sideband signal will be described with respect to a particular example, in which the binary information along path 2, FIG. 1, will be considered to have a bit rate of 6.312 Megabits per second (MBS). As will be evident subsequently, by using a 3-level correlative process, the bandwidth of the line signal appearing on path 18, FIG. 1, will be one-half the serial bit rate and therefore, the occupied bandwidth of the single-sideband signal is expected to be 3.156 MHz. Several clock frequencies are necessary as will be apparent later. For this example the following frequencies in the form of square-waves are employed:

T1-6.312 MHz
T2-1.578 MHz @ 0° phase with respect to T1
T3-1.578 MHz @ 90° phase with respect to T1

Figure 1:
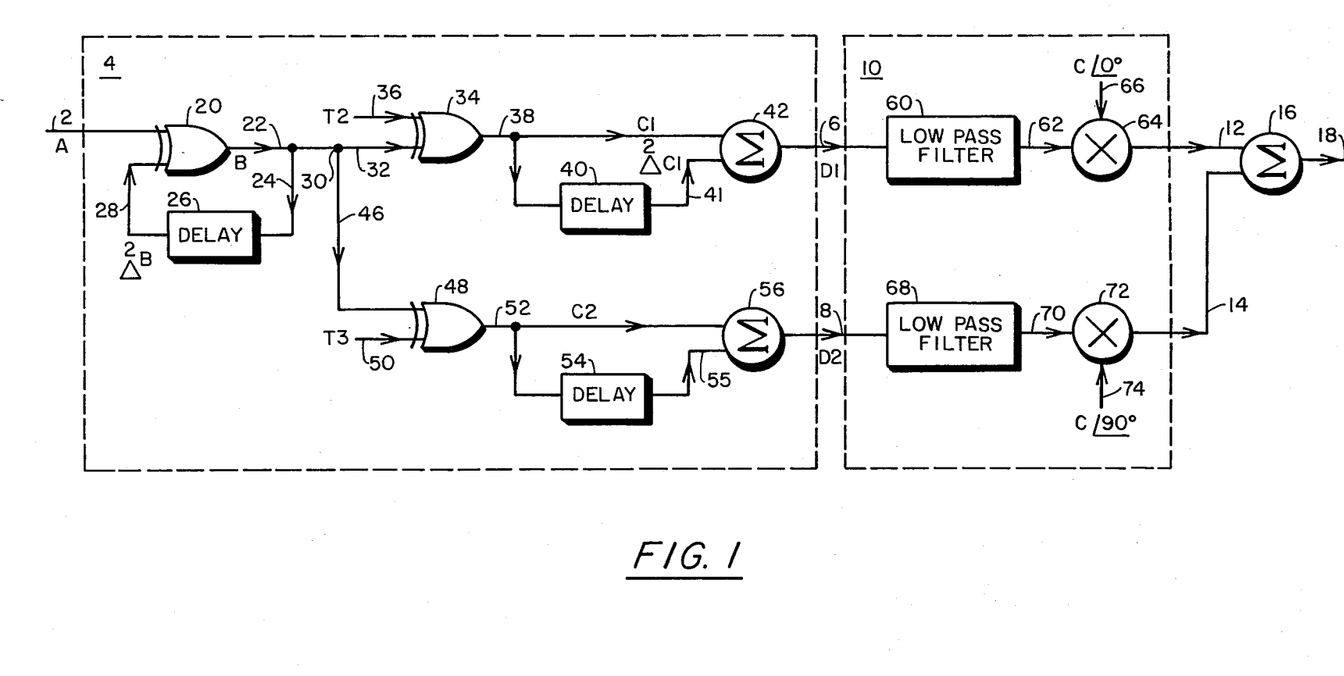
FIG. 1 is a logic and block diagram of the preferred embodiment of a transmitter which generates the single-sideband signal.
Figure 2:
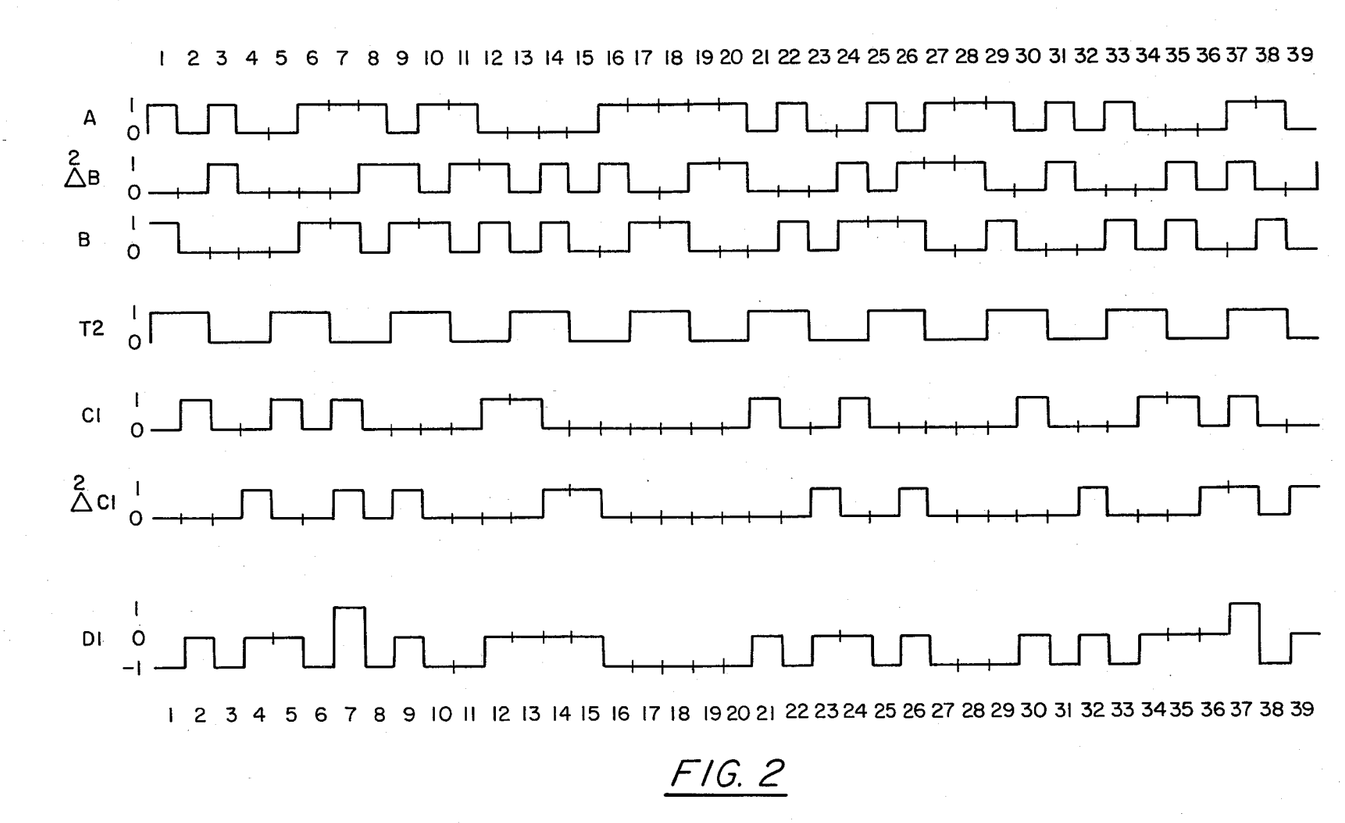
FIG. 2 is a pulse diagram which shows the digital signals at various points in the digital signal processor (4) for the in-phase signals developed from waveform A and in-phase square-wave signal T2.

Referring now to FIG. 1, it may be seen that the 6.312 MBS serial binary signal on path 2 is encoded by transforming the signal on path 2 into a correlated 2-level signal on path 22, in which a present bit is correlated with the second previous bit. This may be accomplished as shown in FIG. 2, by applying the 6.312 MBS serial binary signal to one input of Exclusive-OR gate 20, and at the same time applying to a second input the encoded (correlated 2-level) signal delayed by two symbol intervals at the serial bit rate. Such a delay may be obtained by using, for example, a two-stage shift register for delay 26. The encoded signal then is applied via path 28 to the second input of Exclusive-OR gate 20. The output signal from gate 20 is the modulo-2 addition of the input binary information and the delayed encoded signal, thus, providing the desired correlation between the present digit and the second digit back. This is the same encoding process as is disclosed in FIG. 4, of the U.S. Pat. No. 3,457,510, entitled "Modified Duobinary Data Transmission," by A. Lender and described in the specification there.

For the instant invention, the relationships are shown in pulse form in FIG. 2, where waveform A is the original serial binary signal applied to path 2, waveform B is encoded signal, and waveform $$\overset{2}{\underset{\Delta}{B}}$$

is the encoded signal which is delayed by two symbol intervals at the input binary rate of 6.312 MBS. The character $$\overset{2}{\Delta}$$

is used here to represent a delay of two symbol intervals. The encoded signal is also applied to junction 30, and, then, via path 32 to the in-phase section of the digital processing circuit, and via path 46 to the quadrature-phase digital processing circuit. The operation of both the in-phase and quadrature-phase circuits is the same and therefore only the operation of the in-phase circuit will be described in detail hereinbelow.

The encoded signal on path 32 is applied to a first input of Exclusive-OR gate 34. The in-phase square-wave clock signal T2, having a clock frequency of 1.578 MHz, which is ¼ the serial binary rate, is applied via path 36 to a second input of Exclusive-OR gate 34. The modulo-2 addition of the correlated signal with the T2 clock performed by gate 34 is a form of digital modulation. The resultant waveform from the in-phase digital modulation process is shown at C1 in FIG. 2 and that from the quadrature-phase digital modulation process is shown at C2 of FIG. 3.

The in-phase digitally modulated signal next is applied to a converter, consisting of delay 40 and summer 42, which changes C1 into a 3-level correlative signal D1. This is accomplished by applying the output of Exclusive-OR gate 34, via path 38, to one input terminal of summer 42 and to the input terminal of delay 40. Delay 40 also provides a delay of two symbol intervals at the input serial binary bit rate. As noted hereinabove, such a delay could be obtained by employing a 2-stage shift register. The delayed output then is applied via path 41 to a second input terminal of summer 42 and the summed output which is the 3-level correlative signal appears at path 6. This output on path 6 is shown as waveform D1 on FIG. 2 and is the result of the algebraic summation of waveforms C1 and $$\overset{2}{\underset{\Delta}{C1}}.$$

Figures 3, 4:
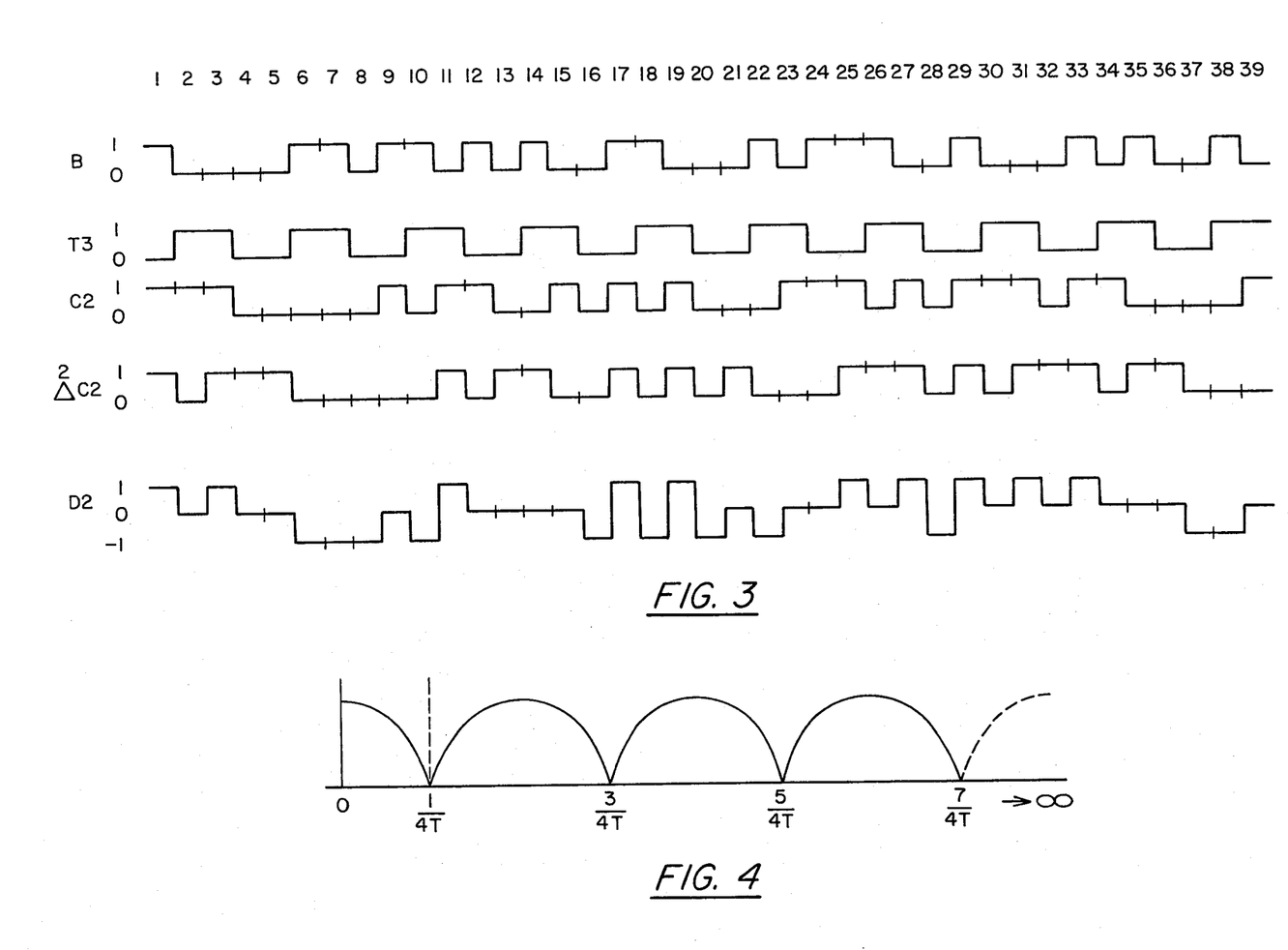
FIG. 3 is a pulse diagram which shows the digital signals at various points in digital signal processor (4) for the quadrature-phase signals developed from the encoded waveform B, FIG. 2, and the quadrature-phase square-wave signal T3.
FIG. 4 is a waveform diagram showing the spectral density of the 3-level signal D1, which appears on path (6), i.e., at the output of summer (42)

As noted above, the quadrature-phase section of the digital processor would develop a similar 3-level signal, but, of course, the quadrature-phase square-wave clock T3 would be employed in the digital modulation process. The waveforms for the generation of the quadrature-phase 3-level correlative signal are shown in FIG. 3, and the corresponding waveforms are C2, $$\overset{2}{\underset{\Delta}{C2}},$$

and D2.

It should be noted the processes in the transmitter are synchronous being controlled by the T1, T2, and T3 clock signals. Thus, the input bits to the digital modulators (gates 34 and 48) at 6.132 MBS are synchronous with the square-wave clock inputs T2 and T3. The input serial binary information being timed by T1 by conventional techniques and, therefore, is not shown. The waveform diagrams show the synchronous relationship of the T2 and T3 clock signals with the serial binary waveform A. As a result, the parallel outputs of the digital modulators are still at 6.312 MBS rate and, superficially, differ from the inputs. However, the spectral densities have been changed. At the input to the digital modulator, the spectral density of each binary pulse train is proportional to $|\sin \pi fT/\pi fT|^2$, where $1/T$ is the bit rate of 6.312 MBS. Nulls occur at multiples of the bit rate. The digital modulators shift this spectrum up and down by 1.578 MHz. In both cases, the bandwidth is essentially infinite, however, the spectral density is repetitive between the nulls.

In the conversion process a 3-level signal is obtained for both the in-phase and quadrature-phase signals. The power conversion factor for the binary spectral density proportional to $|\sin \pi fT/\pi fT|^2$ is then changed to $|1-+e-j^{2\omega T}|^2 = |2 \cos 2\pi fT|^2$ by the conversion process. A portion of the spectrum of an in-phase signal which extends toward infinity is shown in FIG. 4. A similar spectrum, not shown, would be obtained for the quadrature-phase signal.

The next step in the process is to separately band limit the in-phase and the quadrature-phase 3-level correlative signals. This is accomplished by low-pass filters 60 and 68, respectively, as shown in FIG. 1. Only that portion of the spectrum between 0 and 1/4T is selected by the low-pass filters and this is shown in FIG. 4 by the vertical dotted line at 1/4T and in FIG. 5. This is the only band limiting process which is used to generate the single-sideband signal. Each low-pass filter provides a cutoff at a frequency of 1.578 MHz (1/4T) where the original serial bit stream has a bit rate of 6.312 MBS, i.e., at one fourth the serial bit rate. Conventional LC filters may be employed or filters using crystals may also be used to provide the analog low-pass filter characteristic.

Figures 5, 6, 7:
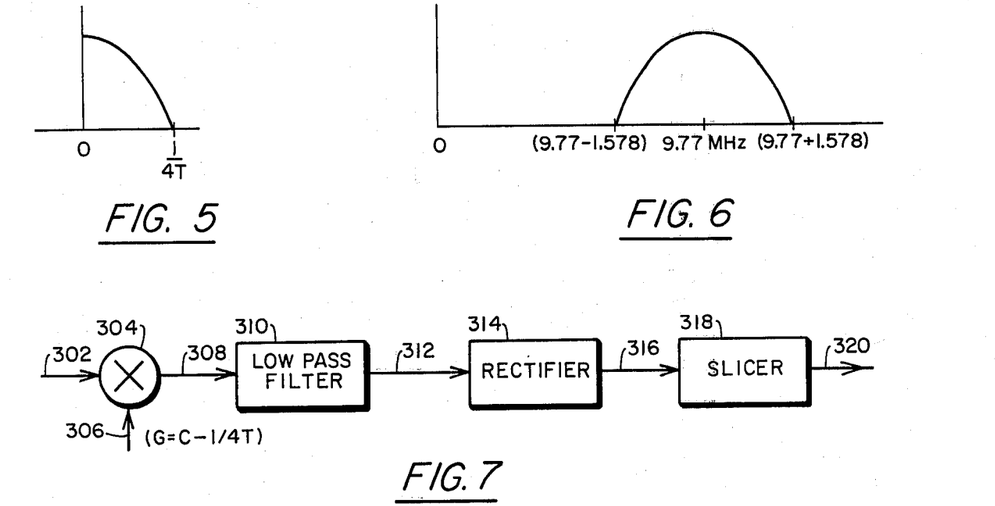
FIG. 5 illustrates the effect of selecting that portion of the signal included between 0 and 1/4T as shown in FIG. 4.
FIG. 6 illustrates the effect of modulating a carrier, having 0 degrees phase and having a frequency of 9.77 MHz, with the 0 to 1/4T signal from FIG. 4.
FIG. 7 is a block diagram showing the basic elements used at a receiver to recover the original binary information.

Analog modulation of the in-phase and quadrature-phase band-limited signals occurs in double-sideband suppressed-carrier amplitude modulators 64 and 72. The band-limited output signals from the two low-pass filters may be translated to any particular portion of the frequency spectrum. However, for our illustrative example, the carrier frequency oscillator is assumed to have a frequency of 9.77 MHz. The basic oscillator output signal is applied via path 66 to a conventional double-sideband, suppressed-carrier modulator 64. A quadrature-phase carrier frequency is derived from the basic oscillator in a conventional manner, which is not shown, and this quadrature-phase carrier frequency is applied via path 74 to a conventional double-sideband amplitude modulator 72. A double-sideband signal is obtained and each sideband occupies the same bandwidth, which, as is shown in FIG. 6, is centered around the carrier frequency of 9.77 MHz. However, the sidebands are of different phase. Thus, the in-phase and quadrature-phase double-sideband, suppressed signals appear respectively on paths 12 and 14 where they are applied to a conventional summer such as 16, which is shown in FIG. 1. The double-sideband signals are summed in summer 16, thereby cancelling the unwanted sidebands and providing the selected single-sideband signal at the output terminal. In our example, the lower sideband has been selected and occupies the band from 8.192 MHz to 11.348 MHz. Note, however, that the upper sideband occupies the same frequency band as the lower sideband and just as easily could have been selected. There is a null at each of these extreme frequencies, and it is convenient in many applications to reintroduce and transmit a small amount of carrier reference frequency at either of the nulls to facilitate the demodulation at a receiving terminal. It should be noted that the 6.312 MBS single-sideband signal is sent in the bandwidth extending from 8.192 MHz to 11.348 MHz, thus providing a transmission efficiency of 2 bits per Hz of bandwidth. Further, as was explained hereinbelow, the modified duobinary signal is implicit in the generation process and becomes explicit only after demodulation and low-pass filtering at the receiver.

It is apparent that the analog modulation frequency could be lower or higher depending upon the form of transmission to be employed. If the transmission facility is to be a radio system (digital radio) then an output in the range specified could be used.

Reverting back to the 3-level waveforms D1 and D2, as shown in FIGS. 2 and 3, it may be seen that neither of these waveforms follow either the duobinary rule nor the modified duobinary rule. It may be recalled that for duobinary, the rule is, if two successive bits are at extreme levels and, if the intervening bits at the center level are an even number, then the extreme level bits must have the same polarity. Otherwise, their polarities are of opposite states. For the modified duobinary rule, one can divide the 3-level signal into odd and even bits and then look at the extreme levels. Each separate odd or even bit stream should have successive extreme levels alternating in polarity.

From a study of the 3-level waveforms, it is evident that neither rule is applicable. While neither the duobinary nor modified duobinary is explicit in these waveforms, shown in FIGS. 2 and 3, the modified duobinary characteristic is in fact, implicit and only explicitly appears at the output of the low-pass filter at the receiver.

Referring to FIG. 7, a portion of a receiver is shown. It is understood that certain modulation processing and possibly even equalization may have occurred prior to the single-sideband signal's appearance on path 302 where it is applied as one input to demodulator 304. The carrier input G on path 306 is equal to the carrier frequency (C) of the original signal either plus or minus the digital modulation frequency, $G = C \pm 1/4T$. In our example, the digital modulation frequency is 1.578 MHz, i.e., $\frac{1}{4}$ of the input serial binary bit rate. The spectral interpretation of the demodulation process is shown in FIG. 7. The lower sideband (could have been upper sideband) is demodulated into a baseband signal and the low-pass filter allows passage of the baseband signal. At this point, the modified duobinary signal characteristic is explicit and the recovery of the original binary information may be obtained by well-known techniques. One way in which this may be done is to provide full-wave rectification of the 3-level modified duobinary signal and then to determine whether or not a binary one appears in each successive time slot. In our example, the modified duobinary signal appearing on path 312 is full-wave rectified in rectifier 314 to provide a unipolar signal at path 316 so that, by means of a simple slicer 318 the state of the signal appearing on path 316 may be readily determined and the output on 320 would be a reconstructed binary 1 or 0 depending upon the amplitude of the unipolar signal at the input to the slicer for each time slot.

Figure 8:
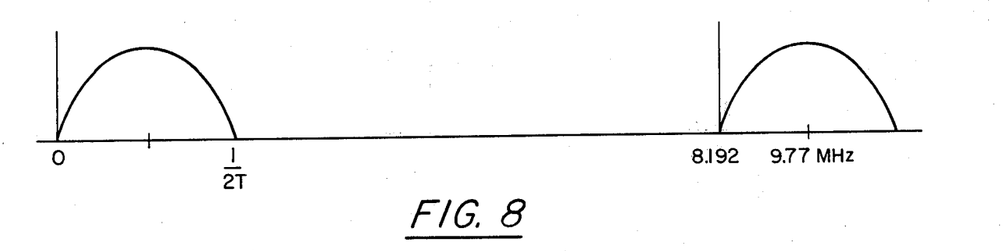
FIG. 8 is a waveform diagram which illustrates the demodulation of the single-sideband signal, which appears on path (18) FIG. 1, using a carrier which is at a frequency of 1.578 MHz below that used in the analog modulation process, i.e., 9.77−1.578=8.192 MHz.
Figure 9:
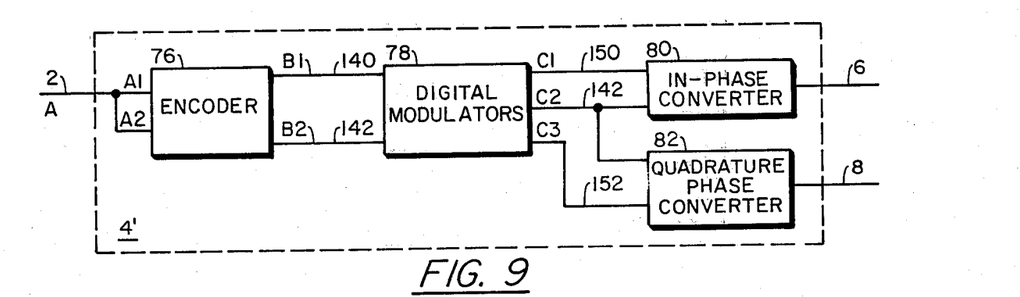
FIG. 9 is a block diagram of an alternate embodiment of the digital signal processor (4), FIG. 1, which may be used in applicant's invention.

An alternate embodiment of the digital processor shown as 4 in FIG. 1 is shown as 4' in block form in FIG. 8. This alternate embodiment is similar to the digital processor described in the related application, however, it will be shown that the output on paths 6 and 8 are 3-level signals, rather than the 7-level signals obtained there. Referring to FIG. 8, it may be seen that the serial binary input signal A on path 2 is applied as identical binary signals A1 and A2 to the parallel inputs of encoder 76, thus, A=A1=A2. The encoded output signals B1 and B2 then appear on paths 140 and 142, respectively. These encoded binary signals are applied to the parallel inputs of digital modulators 78, where they are converted to in-phase and quadrature-phase digitally modulated signals in binary form. The signals C1 and C2 on paths 150 and 142 comprise the in-phase digitally modulated signals and are applied to in-phase converter 80. The signals C3 and C2 on paths 152 and 142 comprise the quadrature-phase digitally modulated signals which are applied to quadrature-phase converter 82. Converters 80 and 82, respectively, convert the in-phase and quadrature-phase digitally modulated signals into a 3-level, in-phase correlative signal which appears on path 6, and a quadrature-phase, 3-level correlative signal which appears on path 8. The 3-level correlative signals are then processed by analog modulators 10 and summer 16, as previously described. Operation of the individual circuit components 76, 78 and 80 of digital processor 4' will now be separately described. Converter 82 operates in a manner similar to that of converter 80 and thus a description of the operation of converter 82 is not included.

Figure 10:
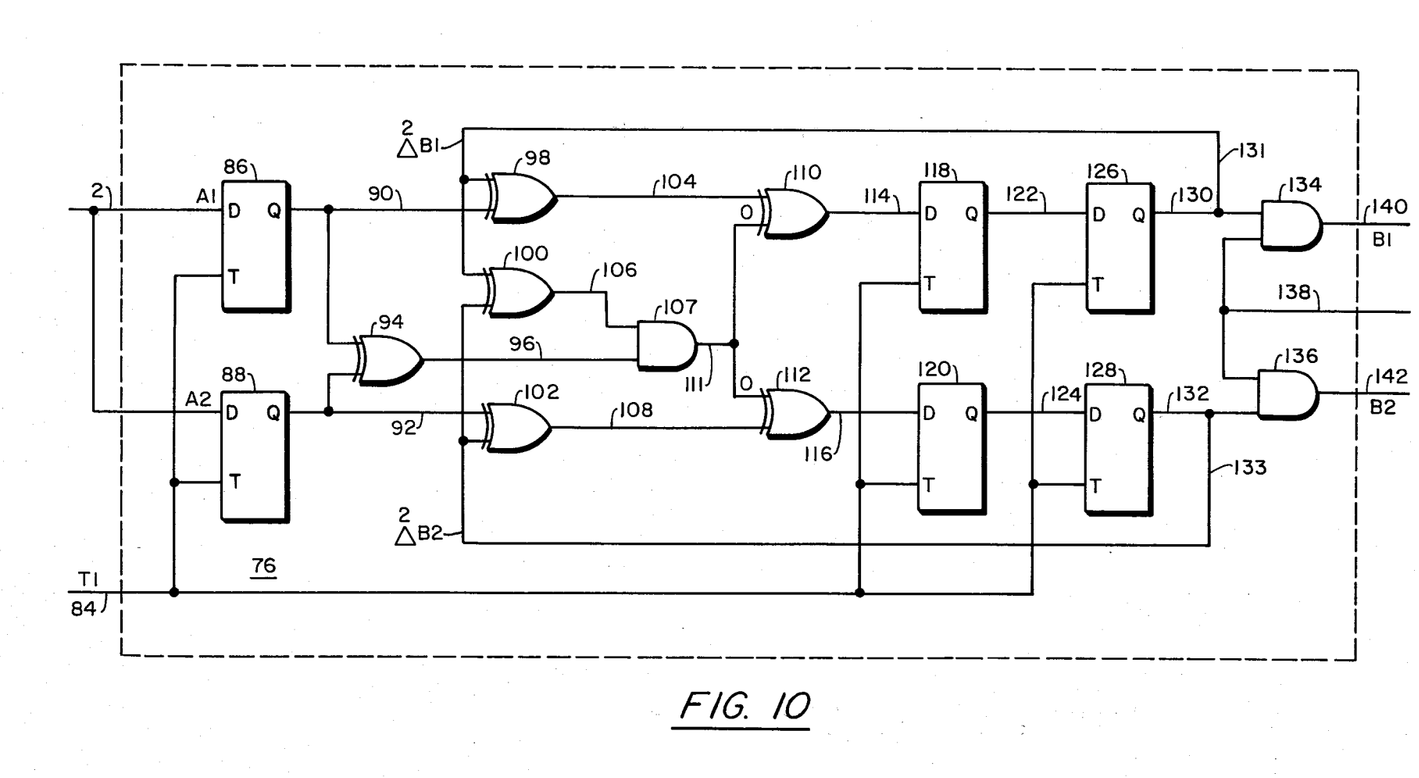
FIG. 10 is a logic circuit diagram illustrating a binary encoder (76) which may be used in the alternate embodiment of digital signal processor (4') of FIG. 9.

The function of encoder 76 is to provide correlation of the present bit at the A1 and A2 input terminals with the second bit back so as to obtain the binary encoded signals B1 and B2. The alternate embodiment of the encoder 76 is shown in FIG. 10, and will now be described. Since A=A1=A2, the input signals to encoder 76 will either be binary "00" or binary "11". The input bit is sequentially applied, respectively, to D-type flip-flops 86 and 88, which are enabled by clock pulse T1 on path 84 so as to simultaneously apply the A1 and A2 parallel bit streams respectively to paths 90 and 92. It is clear that the output binary signals on paths 90 and 92 will also be the same, i.e., binary "00" or binary "11". Because only like states are applied to Exclusive-OR gate 94, the output signal from gate 94 on path 96 will always be a binary "0" which is applied to one input terminal of AND-gate 107, making the output of gate 107 binary "0" for all conditions. As may be seen, the binary "0" output from gate 107 is applied to one input terminal of Exclusive-OR gates 110 and 112, which conditions these gates so that they simply repeat, at their respective output terminals the binary digits which are applied to the other input terminal. Thus, Exclusive-OR gates 110 and 112 are functionally transparent. The basic elements for the encoding process are then comprised of Exclusive-OR gate 98 and a first pair of flip-flops 118 and 126, which are used for encoding the A1 binary input signal; and, the Exclusive-OR gate 102 and a second pair of flip-flops 120 and 128, which are used for encoding the A2 binary input signal. The A1 signal is applied to one input terminal of Exclusive-OR gate 98 and the A2 signal is applied to one input terminal of Exclusive-OR gate 102. Each pair of flip-flops provides the required two symbol interval delay and, as may be seen, the delayed encoded signals B1 and B2 are, respectively, applied to the other input terminal of gate 98 and gate 102. Reverting to FIG. 1, the similarity between the encoder comprising Exclusive-OR gate 20 and delay 26 may be seen. If the initial states of all four flip-flops are the same, it is apparent that the encoded outputs B1 and B2 would also be the same. They would be different, of course, if the states of the flip-flops were not the same. In order to simplify the diagram, and without loss of generality, the waveforms in FIG. 13, were derived on the assumption that initially all four flip-flops were at a binary "0" state. By comparing waveforms B1 and B2 of FIG. 13, with waveform B of FIG. 2, it is readily seen that the process produces the same result.

At this point, it might be well to consider why one would use the encoding technique as shown in FIG. 10, since the encoding shown in FIG. 1, is considerably simpler. An advantage of this alternate technique is that a single-sideband signal can be generated to transmit, for example, either a 12.624 MBS or a 6.312 MBS digital signal with only a minor modification of the transmitter. For example, a simple built-in switching arrangement is all that would be required. The input circuit arrangement for the digital signal processor of the related application contains first a serial-to-parallel converter, with the parallel outputs being separately applied to the two input terminals of an encoder, such as 76, shown in FIG. 10 here. In the instant invention, the same input is applied to both input terminals of encoder 76. Thus, the switch need only bypass the serial-to-parallel converter and connect the serial bit stream to both encoder input terminals. In such an arrangement, the binary "0" input would appear as a binary "00" and the binary "1" input, as a binary "11", which in gray code represents respectively the 0 level and the +2 or −2 level, as is shown in Table I, as follows.

TABLE I

| Level | Gray Code B1 | Gray Code B2 | BCD Code B1 | BCD Code B2 |
|---|---|---|---|---|
| 3 | 1 | 0 | 1 | 1 |
| 2 | 1 | 1 | 1 | 0 |
| 1 | 0 | 1 | 0 | 1 |
| 0 | 0 | 0 | 0 | 0 |
| −1 | 1 | 0 | 1 | 1 |
| −2 | 1 | 1 | 1 | 0 |
| −3 | 0 | 1 | 0 | 1 |

It is apparent, from Table I, that the extreme levels are not employed by using this technique and that some disadvantage results because of the use of intermediate levels, thus causing a deterioration of the signal-to-noise ratio that could be achieved. However, the 3-level signal that is obtained can be transmitted at a higher level using more amplification and, as is apparent from Table I, the slicing level is essentially doubled. Thus, a considerable signal-to-noise ratio improvement may be obtained in comparison to that obtainable for the 7-level technique described in the related application. Further, the signal which ultimately will be derived from this encoding process is implicitly modified duobinary at the transmitter and becomes an explicit modified duobinary signal following the low-pass filter at the receiver, as has been explained hereinabove.

The encoder output signals B1 and B2 in FIG. 10, may also be expressed as Boolean functions of the input binary signals A1 and A2, as follows:

$$Bi = Ai \oplus \Delta^2 Bi \oplus [(A1 \oplus A2) \cdot (\Delta^2 B1 \oplus \Delta^2 B2)] \quad (1)$$

where
  $i = 1, 2$
  $\oplus$ = modulo-2 addition
  $\cdot$ = AND function

Since A1 = A2 and due to the fact that Ai is equal to A for the 3-level system, as described above, the Boolean equation shown in (1) reduces to $$Bi = A \oplus \Delta^2 Bi \quad (2)$$

where
  $\oplus$ = modulo-2 addition, and
  $i = 1, 2$.

The designator, i, must be retained since B1 may not be equal to B2 and, similarly, $$\Delta^2 B1$$

may not be equal to $$\Delta^2 B2.$$

This is because of the use of the memory devices in the encoder 76, as previously explained. The initial states of the memory devices are strictly arbitrary and, for this reason, the encoded and delayed encoded binary signals may be different one from the other. By rearranging the Boolean equation shown in (2), the Boolean form of the encoding equation becomes:

$$A = Bi \oplus \Delta^2 Bi \quad \text{(Boolean)} \quad (3)$$

where
  $\oplus$ = modulo-2 addition, and
  $i = 1, 2$, and this is exactly the form of the Boolean function for modified duobinary encoding. This may be seen by referring to FIG. 1, where it is seen that the Exclusive-OR gate 20 accepts the serial binary input on path 2 and the delayed encoded $$\Delta^2 B$$

on path 28 to provide at the output on path 22 the binary encoded signal B. Reference should also be made to FIG. 4, of the U.S. Pat. No. 3,457,510, issued July 22, 1969 to A. Lender, entitled "Modified Duobinary Data Transmission" in which the same general encoding arrangement is employed to transform the input binary pulse train into a correlated two-level signal.

While it is not necessary to an understanding of the invention, it should be noted that even though the initial states of the four flips-flops 118, 120, 126, and 128 are strictly arbitrary and therefore, the encoded binary signals Bi may have any of the binary states, it may be shown that the three level signal is limited to output of 0 or ±2 in decimal form, or, in binary form, "00" or "11". The following examples illustrate this fact. Let A represent the serial input binary pulse train; let B represent the encoded pulse train; and, let X represent the three level pulse train. Also, the binary states follow the Gray Code as shown in Table I. Further, the two parallel A's are identical i.e., either binary "00" or "11", or, in decimal form, 0 or 2. But as noted above, the encoded state can be of the four combinations 00, 01, 11 or 10 in binary form, or 0, 1, 2 or 3 in decimal form. The three level waveform is obtained by algebraic addition in accordance with the following equation.

$$X = B - \overset{2}{\Delta} B \qquad (4)$$

The following examples will illustrate how the variety of encoded states are limited to the permitted states at the output.

| Example 1: (in decimal form) |
|---|
| A   0 0 0 2 2 2 0 2 0 2 2 2 0 0 2 2 2 0 0 0 2 |
| B   3 3 3 3 3 1 1 3 1 1 1 3 3 1 3 1 1 3 3 3 3 1 |
| X   0 0 0 -2 -2 2 0 -2 0 2 2 -2 0 0 -2 2 2 0 0 0 -2 |

| Example 2: (in decimal form) |
|---|
| A   0 0 0 2 2 2 0 2 0 2 2 2 0 0 2 2 2 0 0 0 2 |
| B   2 3 2 3 2 1 0 3 0 1 0 3 2 1 2 1 0 3 2 3 2 3 0 |
| X   0 0 0 -2 -2 2 0 -2 0 2 2 -2 0 0 -2 2 2 0 0 0 -2 |

Figure 11:
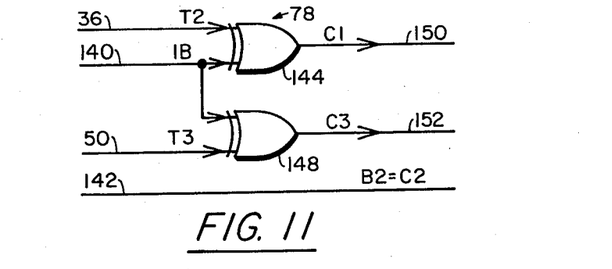
FIG. 11 is a logic diagram of the digital modulator (78) shown in FIG. 9.

The encoded bit streams are applied next to digital modulators 78, which are shown in logic diagram FIG. 11. Here, the encoded bit stream B1 is considered to represent the most significant bit, and the encoded bit stream, B2, is considered to represent the least significant bit. Only the encoded bit stream, B1, is directly involved in the modulation process which consists essentially of modulo-2 addition of the most significant bit, B1, separately with the T2 and T3 clock to obtain the C1 and C3 bit streams. Referring now to FIG. 11, it is seen that the binary encoded signal, B1, is applied to one input terminal of both Exclusive-OR gates 144 and 148. The in-phase T2 square-wave clock signal is applied to a second input terminal of Exclusive-OR gate 144 and the quadrature-phase T3 clock signal is applied to a second input terminal of Exclusive-OR gate 148. The in-phase digitally modulated binary signal is represented by the C1 bit stream on path 150, and the C2 bit stream on path 142; and the quadrature-phase digitally modulated binary signal C3, is represented by the bit stream on path 152, and the C2 bit stream on path 142.

As may be seen the B2 signal is unchanged, but now is called C2.

Conceptually, the C1, C2 and C3 bit streams are each subjected to digital filtering, which consists of the summation of the present digit with a digit delayed by two-bit intervals. Such an arrangement is shown, for example, as delay 40 and summer 42 in FIG. 1. However, in following the technique described in the related application, the 3-level correlated signals on paths 6 and 8 are obtained by the conversion process shown in FIG. 12.

As previously noted, the in-phase digitally modulated signal consists of bit streams C1 and C2 and the quadrature-phase bit stream consists of digitally modulated bit streams C3 and C2. These signals are separately converted into in-phase and quadrature-phase 3-level signals, respectively, in the in-phase converter 80 and the quadrature-phase converter 82 with the 3-level output signals appearing, respectively, on paths 6 and 8. Because the basic conversion process is the same for both the in-phase and the quadrature-phase converters, only the in-phase converter operation will be described in detail.

Figure 12:
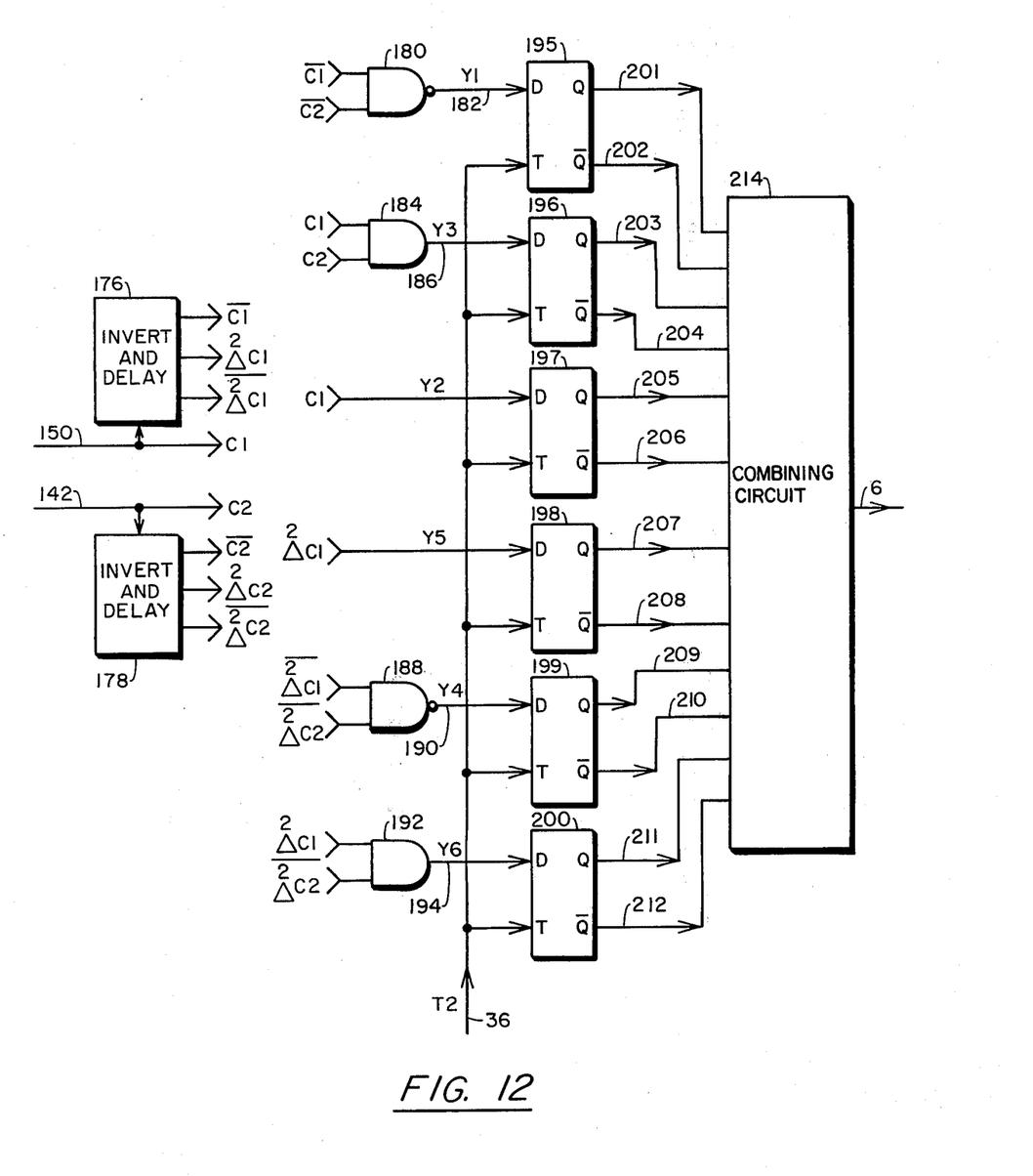
FIG. 12 is a logic diagram of the in-phase converter (80) as shown in FIG. 9.

Referring now to FIG. 12, invert and delay 176 accepts the filtered C1 output signal on path 172 and inverts it to provide a $\overline{C1}$ signal and further delays both the C1 and $\overline{C1}$ signals by two bit intervals to obtain $$\overset{2}{\Delta} C1 \quad \text{and} \quad \overset{2}{\Delta} \overline{C1}$$

signals for use in the 2- to 3-level conversion process. Invert and delay 178 provides the same type of output signals for the least significant bit of the pair, C2. Further, circuit elements are included to maintain synchronism of the C output signals. Such invert and delay techniques are well-known and are not further described here. The next step is the actual conversion from 2 to 3 levels using the C1 and C2 signals and the delayed and inverted versions thereof, as illustrated in FIG. 12. Following the invert and delay steps, the remaining steps in the conversion process comprise (1) the performance of logic functions by the use of AND-gates 184 and 192, and NAND-gates 180 and 188; (2) the derivation of six logic states by the use of flip-flops 195–200; and (3) the combining of the currents resulting from the logic state output signals obtained from flip-flops 195–200, in combining circuit 214, so as to derive the appropriate level of the 3-level correlative signal for each bit interval at the input serial bit rate, A. As may be seen in referring to FIG. 12, the binary logic equations for this in-phase process are.

$$\left.\begin{array}{ll} Y1 = C1 + C2 & Y4 = \overset{2}{\Delta}C1 + \overset{2}{\Delta}C2 \\ Y2 = C1 & Y5 = \overset{2}{\Delta}C1 \\ Y3 = C1 \cdot \overline{C2} & Y6 = (\overset{2}{\Delta}C1) \cdot (\overset{2}{\Delta}\overline{C2}) \end{array}\right\} \text{Boolean}$$

where
the + defines an OR function, and
· represents and AND function
Further algebraic addition $$U = \sum_{i=1}^{6} Y_i$$

is performed to derive the 3-level signals.

Figure 13:
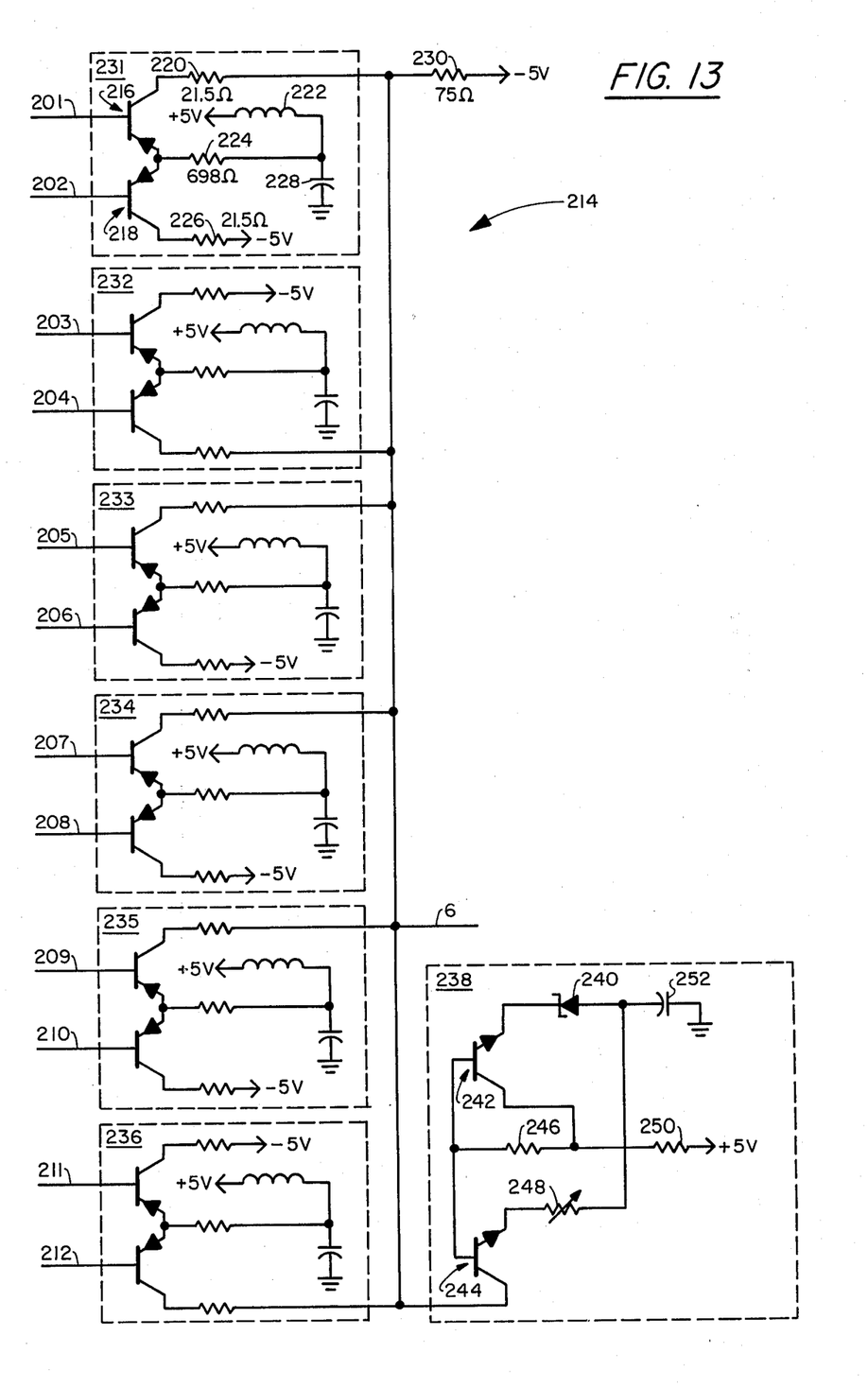
FIG. 13 is a schematic diagram of the combining circuit (214) used in the in-phase converter (80) of FIG. 12.
Figure 14:
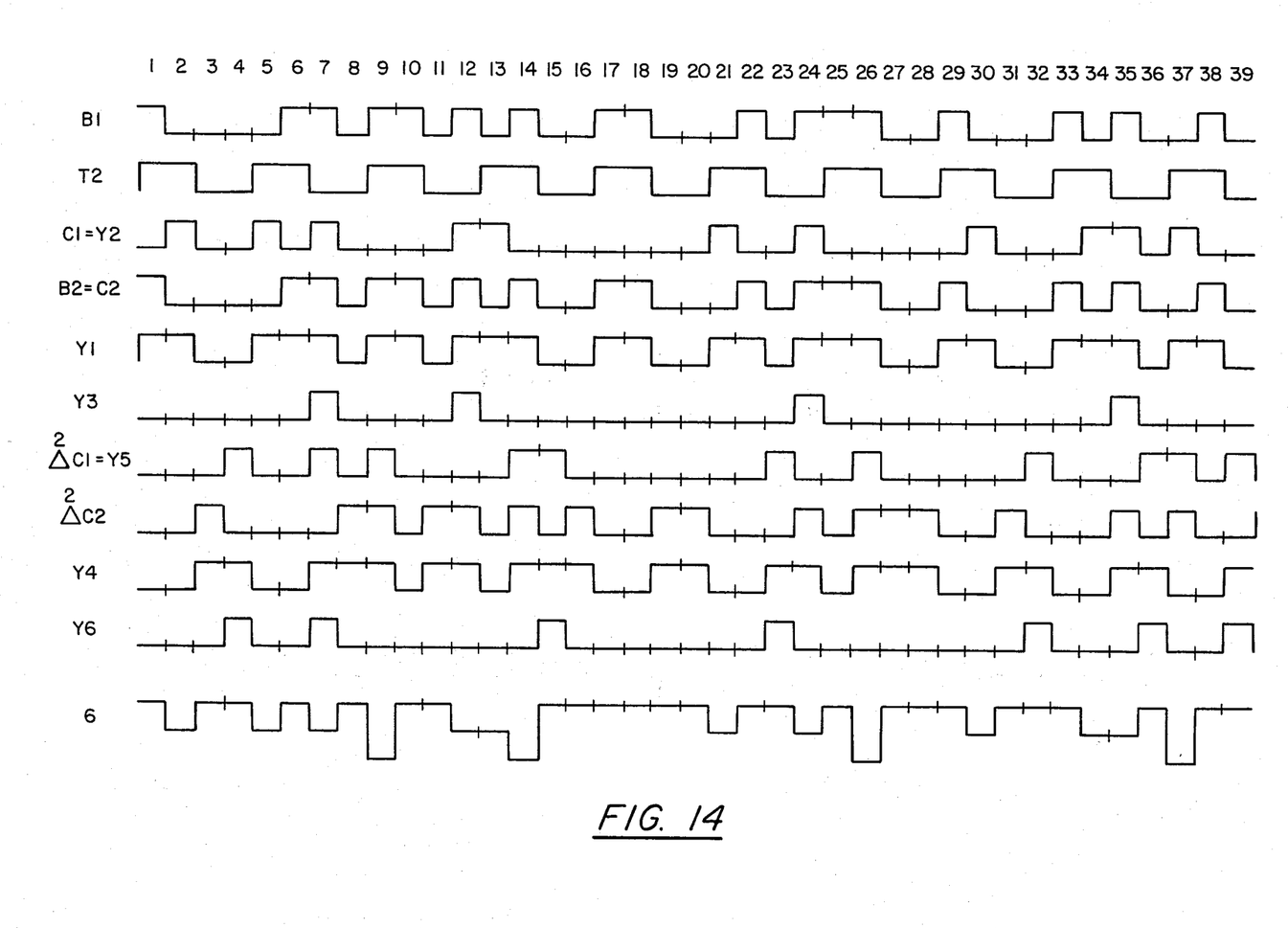
FIG. 14 is a pulse diagram illustrating the conversion to 3-levels for in-phase converter (80).

Waveforms for the different states of the conversion process are shown in FIG. 14, and are related to the signal conditions at various points in FIGS. 12 and 13. In particular, the 3-level correlative signal shown at 6 (path 6, FIGS. 12 & 13) is derived using combining circuit 214. Operation of the combining circuit is described below:

Because the logic functions to be accomplished for the quadrature-phase signal is the same as that for the in-phase signal, a similar set of equations shown below would also represent the binary logic functions used there. For the in-phase conversion, it is to be noted that clock T2 is used to provide the timing for each of the D-type flip-flops. Similarly, for the quadrature-phase conversion, the timing would be provided by clock T3.

$$\left. \begin{array}{ll} Y7 = C3 + C2 & Y10 = \overset{2}{\Delta}C3 + \overset{2}{\Delta}C2 \\ Y8 = C3 & Y11 = \overset{2}{\Delta}C3 \\ Y9 = C3 \cdot \overline{C2} & Y12 = (\overset{2}{\Delta}C3) \cdot (\overset{2}{\Delta}\overline{C2}) \end{array} \right\} \text{Boolean}$$

where
 the + represents an OR function, and
 · represents an AND function.
Further, algebraic addition $$V = \sum_{i=7}^{12} Y_i$$

is performed to derive the 3-level signals.

A circuit which may be used to accomplish the algebraic combining is shown in more detail in FIG. 13. The summation stage for flip-flop 195 is shown at 231 and its operation is as follows: The two PNP transistors 216 and 218 are used to provide good balance. The voltages available from either Q or $\overline{Q}$ are either below 0.8 V or binary "0", or above 3.5 V or binary "1". When Q is high, transistor 216 is cut off and the output is a −5 V. At the same time, $\overline{Q}$ is low so that transistor 218 is turned on to make sure that transistor 214 is cut off. The voltage at the emitter of transistor 218 is 0.8 V (the output of $\overline{Q}$) plus the base emitter voltage 0.7 V for a total of 1.5 V with respect to ground. But the base of transistor 216 is 3.5 V so that transistor 216 is cut off. For the other condition, i.e., Q=binary "0" and $\overline{Q}$=binary "1", Q is roughly 0.8 V and transistor 216 is turned on while transistor 218 is cut off since $\overline{Q}$ is at 3.5 V. In this condition, the output current is approximately 3.5 V. In this condition, the output current is approximately 3.5 V÷698 Ω. This illustrates the technique of operation and it is to be understood that the remaining stages 232–236 operate similarly. However, it should be noted that 232 and 236 are connected in an inverse manner to that of 231 and 233–235. Therefore, the outputs from 232 and 236 will be opposite from that described for 231 for the same input conditions. A 3-level output signal is obtained as shown in FIG. 14. Only the in-phase 3-level signal is shown, but it is understood that a quadrature-phase 3-level signal would also be obtained by using a similar conversion circuit.

The 3-level digital output signal obtained from the in-phase and quadrature-phase processes appear on paths 6 and 8 and are applied next to the analog modulator 10 and the summer 16 (FIG. 1) to derive the single-sideband signal. Operation of analog modulator 10 and summer 16 have been previously described.

While the invention has been particularly shown and described with reference to preferred embodiments thereof, it will be understood by those skilled in the art that changes in form and detail may be made therein without departing from the spirit and scope of the invention.

What is claimed is:

1. Apparatus for generating a single-sideband signal from a serial bit stream, which comprises:
 binary means for processing said serial bit stream to obtain in-phase and quadrature-phase 2-level correlative signals;
 means for digitally converting said in-phase and said quadrature-phase 2-level correlative signals, respectively, into in-phase and quadrature-phase 3-level correlative signals;
 a line-frequency oscillator arranged to provide in-phase and quadrature-phase line carrier frequency components;
 means for separately analog modulating the in-phase and quadrature-phase line carrier frequency components, respectively, with the in-phase and quadrature-phase 3-level signals; and
 means for summing the modulation products obtained from the in-phase and quadrature-phase analog modulation processes, whereby the single-sideband signal is obtained.

2. Apparatus for generating a single-sideband signal from a serial bit stream having a bit rate of K bits per second, which comprises:
 input terminals arranged to accept said serial bit stream;
 binary means for processing the accepted serial bit stream to obtain in-phase and quadrature-phase 2-level correlative signals;
 means for digitally converting said in-phase and said quadrature-phase 2-level correlative signals, respectively, into in-phase and quadrature-phase 3-level correlative signals;
 a line-frequency oscillator arranged to provide in-phase and quadrature-phase line carrier frequency components;
 means for separately analog modulating the in-phase and quadrature-phase line carrier frequency components, respectively, with the in-phase and quadrature-phase 3-level signals; and
 means for summing the modulation products obtained from the in-phase and quadrature-phase analog modulation processes, whereby the single-sideband signal is obtained.

3. Apparatus as set forth in claim 2 wherein said binary means comprises:
 a timing circuit which provides a clock pulse signal T1=KHz and clock pulse signals of T2 and T3 both equal to K/4 Hz, the T2 clock being in-phase, and the T3 being in quadrature-phase with the T1 clock pulse signal;
 means for encoding said serial bit stream to obtain a 2-level encoded signal at the bit rate K;
 first means for digitally modulating the encoded bit stream with the T2 clock so as to obtain said in-phase 2-level correlative signal; and
 second means for digitally modulating the encoded bit stream with the T3 clock so as to obtain said quadrature-phase 2-level correlative signal.

4. Apparatus as set forth in claim 3, where said encoding means comprises:
   a first delay means having an input and output terminal, and providing a delay for the encoded binary signal of two symbol intervals at the bit rate of said serial bit stream;
   a first Exclusive-OR gate having a first input terminal connected to accept said serial bit stream, having a second input terminal connected to the output terminal of said delay means and having an output terminal connected to the input terminal of said delay means.

5. Apparatus as set forth in claim 4, wherein said first means comprises:
   a second Exclusive-OR gate having a first input terminal connected to the output terminal of said first Exclusive-OR gate, having a second input terminal connected to accept the T2 clock pulse signal and having an output terminal.

6. Apparatus as set forth in claim 5, wherein said second means comprises:
   a third Exclusive-OR gate having a first input terminal connected to the output terminal of said first Exclusive-OR gate, having a second input terminal connected to accept said T3 clock pulse signal and having an output terminal.

7. Apparatus as set forth in claim 6, wherein said digitally converting means comprises:
   a second delay means having an input terminal connected to the output terminal of said second Exclusive-OR gate, and an output terminal; and providing a delay of two digit intervals at the bit rate of the serial bit stream;
   a first algebraic summer, having a first input terminal connected to the output terminal of said first means, having a second input terminal connected to the output terminal of said second delay means and and having an output terminal, whereby the 3-level in-phase correlative signal is obtained;
   a third delay means having an input terminal connected to the output terminal of said third Exclusive-OR gate, and an output terminal; and providing a delay of two digit intervals at the bit rate of the serial bit stream; and
   a second algebraic summer having a first input terminal connected to the output terminal of said second means, having a second input terminal connected to the output terminal of said third delay means and having an output terminal, whereby the 3-level quadrature-phase correlative signal is obtained.

8. Apparatus as set forth in claim 7, wherein said means for analog modulating further comprises:
   a first analog low-pass filter, having a passband from substantially a zero frequency to a frequency equivalent to K/4 Hz, said first low-pass filter having an input terminal arranged to accept said in-phase 3-level correlative signal, and providing an in-phase band limited signal at an output terminal;
   a first amplitude modulator having a first input terminal connected to the output terminal of said first low-pass filter, having a second input terminal connected to receive the in-phase carrier frequency component, and providing an in-phase double-sideband, suppressed-carrier modulated signal at an output terminal;
   a second analog low-pass filter having a passband from substantially a zero frequency to a frequency equivalent to K/4 Hz, said first low-pass filter having an input terminal arranged to accept said quadrature-phase 3-level correlative signal, and providing a quadrature-phase band limited signal at an output terminal;
   a second amplitude modulator having a first input terminal connected to the output terminal of said second low-pass filter, having a second input terminal connected to receive the quadrature-phase carrier frequency component, and providing a quadrature-phase double-sideband, suppressed-carrier modulated signal at an output terminal.

9. Apparatus as set forth in claim 2 wherein said binary means comprises:
   a timing circuit which provides at a first output terminal a clock pulse signal T1 having a pulse repetition rate of K, and at second and third output terminals, respectively, clock pulse signals T2 and T3 each having a pulse repetition rate of K/4, with T2 being in-phase with and T3 being in quadrature-phase with said T1 clock pulse signal;
   means for encoding said serial bit stream to obtain first (B1) and second (B2) 2-level correlated signals each having a bit rate of K; and
   means for digitally modulating said 2-level correlated signals to obtain in-phase and quadrature-phase digitally modulated binary signals.

10. Apparatus as set forth in claim 9 wherein said means for encoding comprises:
    a first Exclusive-OR gate having first and second input terminals and a first output terminal;
    a second Exclusive-OR gate having third and fourth input terminals and a second output terminal;
    a first delay means having a first input terminal connected to said first output terminal, and having an output terminal connected to said first input terminal, said first delay means providing a two bit delay at the serial bit rate;
    a second delay means having a second input terminal connected to the second output terminal, and having an output terminal connected to said third input terminal, said second delay means providing a two bit delay at the serial bit rate; and
    means for simultaneously applying said serial input bit stream to said second and fourth input terminals.

11. Apparatus as set forth in claim 10 wherein said first and second delay means each comprise a two-stage shift register.

12. Apparatus as set forth in claim 10 or 11 wherein said means for digitally modulating comprises:
    a third Exclusive-OR gate having a third output terminal, having a fifth input terminal connected to the output terminal of said first delay means, and having a sixth input terminal connected to the second output terminal of said timing circuit;
    a fourth Exclusive-OR gate having a fourth output terminal, having a seventh input terminal connected to the output terminal of said second delay means and having an eighth input terminal connected to the third output terminal of said timing circuit.

13. Apparatus as set forth in claim 10 or 11 wherein said means for digitally modulating comprises:
    a first digital modulator which accepts the encoded bit streams B1 and B2 and the T2 clock signal and inverts the most significant coded bit stream B1 in accordance therewith to obtain a binary signal C1, whereby an in-phase digitally modulated binary signal represented by C1 and C2=B2 is derived; and a second digital modulator which accepts the encoded bit streams B1 and B2 and the T3 clock signal and inverts the most significant coded bit stream B1 in accordance therewith to obtain a binary signal C3, whereby a quadrature-phase digitally modulated binary signal represented by C3 and C2=B2 is derived.

14. Apparatus as set forth in claim 13 wherein said means for digitally converting comprises:

means for inverting and delaying the C1, C2 and C3 signals to obtain $\overline{C1}, \overline{C2}, \overline{C3}$, $$\overset{2}{\Delta}C1, \overset{2}{\Delta}C1, \overset{2}{\Delta}\overline{C1}, \overset{2}{\Delta}C2, \overset{2}{\Delta}\overline{C2}, \overset{2}{\Delta}C3 \text{ and } \overset{2}{\Delta}\overline{C3}$$

signals;

a first logic means for deriving 6 binary states in accordance with the following logic equations:

$$Y1 = C1 + C2 \qquad Y4 = \overset{2}{\Delta}C1 + \overset{2}{\Delta}C2$$
$$Y2 = C1 \qquad Y5 = \overset{2}{\Delta}C1$$
$$Y3 = C1 \cdot \overline{C2} \qquad Y6 = (\overset{2}{\Delta}C1) \cdot (\overset{2}{\Delta}\overline{C2})$$

where
+ is equal to an OR function,
· is equal to an AND function, and $\overset{2}{\Delta}$ indicates a delay of two symbol intervals;
a second logic means for deriving 6 binary states in accordance with the following logic equations:

$$Y7 = C3 + C2 \qquad Y10 = \overset{2}{\Delta}C3 + \overset{2}{\Delta}C2$$
$$Y8 = C3 \qquad Y11 = \overset{2}{\Delta}C3$$
$$Y9 = C3 \cdot \overline{C2} \qquad Y12 = (\overset{2}{\Delta}C3) \cdot (\overset{2}{\Delta}\overline{C2})$$

first means responsive to the 6 binary states of said first logic means and clock signal T2 for storing each of the 6 binary states and the complements thereof for one T2 clock interval;

a first combining means responsive to the normal and complementary binary states of said first responsive means for deriving the 3-level in-phase signal;

second means responsive to the 6 binary states of said second logic means and clock signal T3 for storing each of the six binary states and complements thereof for one T3 clock interval; and a second combining means responsive to the normal and complementary binary states of said second means for deriving the 3-level quadrature-phase signal.

15. In a system for generating a single-sideband signal for the transmission of digital information, apparatus for converting a serial binary bit stream having a bit rate of 1/T into an in-phase 3-level correlative signal, which comprises:

means for transforming the serial binary bit stream into a 2-level correlated signal in which a present bit is correlated with the second previous bit; said means for transforming comprising first delay means having an input and an output terminal, said first delay means providing a delay of two digit intervals at the bit rate of the serial binary bit rate; and a first Exclusive-OR gate having an output terminal, and having a first input terminal connected to accept said serial binary bit stream, having a second input terminal connected to the output terminal of said first delay means, said output terminal being connected to the input terminal of said first delay means; and means for digitally modulating the 2-level correlated signal to obtain said in-phase 3-level correlative signal; said means for digital modulating comprising clock signals of T1 and T2 at a second output terminal, the T1 clock signal having a pulse rate equal to the serial binary rate of 1/T and the T2 clock signal having a pulse rate equal to 1/4T; a second Exclusive-OR gate hving a first input terminal connected to the output terminal of said first Exclusive-OR gate, having a second input terminal connected to the second output terminal of said clock means, and having an output terminal; second delay means having an input connected to the output terminal of said second Exclusive-OR gate and having an output terminal, said second delay means providing a delay of two digit intervals at the serial binary bit rate; and summing means having an output terminal, having a first input terminal connected to the output terminal of said second Exclusive-OR gate, having a second input terminal connected to the output terminal of said second delay means, whereby a 3-level correlative signal is obtained.

16. Apparatus as set forth in claim 15 wherein said first and second delay means each comprise a two-stage shift register.

17. A digital transmission system which comprises:
at a transmitting terminal, means for deriving a single-sideband signal from a serial bit stream, comprising:
binary means for processing said serial bit stream to obtain in-phase and quadrature-phase 2-level correlative signals;
means for digitally converting said in-phase and said quadrature-phase 2-level correlative signals, respectively, into in-phase and quadrature-phase 3-level correlative signals;
a line frequency oscillator arranged to provide in-phase and quadrature-phase carrier frequency components;
means for separately analog modulating the in-phase and quadrature-phase carrier frequency components, respectively, with the in-phase and quadrature-phase 3-level correlative signals; and
means for summing the modulation products obtained from the in-phase and quadrature-phase analog modulation processes to derive a single-sideband signal centered about said line carrier frequency for transmission; and
means for recovering, at a receiving terminal, the serial bit stream from the single-sideband signal which comprises:
means for demodulating said single-sideband signal to obtain a voice-band 3-level modified duobinary signal; and
means for translating said modified duobinary signal into a digital signal which is representative of said serial bit stream.

18. A system as set forth in claim 17 wherein said binary means comprises:
- a timing circuit which provides clock pulse signals at T1=K MHz and T2, and T3, both equal to K/4 MHz, the T2 clock being an in-phase, and the T3 being in quadrature-phase with the T1 clock pulse signal;
- means for encoding said serial bit stream to obtain a 2-level encoded signal at the bit rate K;
- first means for digitally modulating the encoded signal with the T2 clock so as to obtain said in-phase 2-level correlative signal; and
- second means for digitally modulating the encoded signal with the T3 clock so as to obtain said quadrature-phase 2-level correlative signal.

19. A system as set forth in claim 18 wherein said encoding means comprises:
- a first delay means having an input and an output terminal, and providing a delay for the encoded binary signal of two digit intervals at the bit rate of the serial bit stream;
- a first Exclusive-OR gate having a first input terminal connected to accept said serial bit stream, having a second input terminal connected to the output terminal of said delay means and having an output terminal connected to the input terminal of said delay means.

20. A system as set forth in claim 19 wherein said first means further comprises:
- a second Exclusive-OR gate having a first input terminal connected to the output terminal of said first Exclusive-OR gate, having a second input terminal connected to accept the T2 clock pulse signal and having an output terminal.

21. A system as set forth in claim 20 wherein said second means further comprises:
- a third Exclusive-OR gate having a first input terminal connected to the output terminal of said first Exclusive-OR gate, having a second input terminal connected to accept said T3 clock pulse signal and having an output terminal.

22. A system as set forth in claim 21 wherein said digitally converting means comprises:
- a second delay means having an input terminal connected to the output terminal of said second Exclusive-OR gate, and an output terminal; and providing a delay of two digit intervals at the bit rate of the serial bit stream; and
- an algebraic summer, having a first input terminal connected to the output terminal of said first means, having a second input terminal connected to the output terminal of said second delay means and having an output terminal, whereby the 3-level in-phase correlative signal is obtained.

23. A system as set forth in claim 22 wherein said first digitally converting means further comprises:
- a third delay means having an input terminal connected to the output terminal of said third Exclusive-OR gate, and an output terminal; and providing a delay of two digit intervals at the bit rate of the serial bit stream;
- a second algebraic summer having a first input terminal connected to the output terminal of said second means, having a second input terminal connected to the output terminal of said third delay means and having an output terminal, whereby the 3-level quadrature-phase correlative signal is obtained.

24. A system as set forth in claim 23 wherein said means for deriving a single-sideband signal further comprises:
- a carrier frequency oscillator providing in-phase and quadrature-phase carrier signal components;
- a first analog low-pass filter, having a passband from substantially a zero frequency to a frequency equivalent to K/4, said first low-pass filter having an input terminal connected to the output terminal of said first analog summer, and providing an in-phase band limited signal at an output terminal;
- a first amplitude modulator having a first input terminal connected to the output terminal of said first low-pass filter, having a second input terminal connected to receive the in-phase carrier frequency component, and providing an in-phase double-sideband, suppressed-carrier modulated signal at an output terminal;
- a second analog low-pass filter having a passband from substantially a zero frequency to a frequency equivalent to K/4, said second low-pass filter having an input terminal connected to the output terminal of said second analog summer, and providing a quadrature-phase band limited signal at an output terminal;
- a second amplitude modulator having a first input terminal connected to the output terminal of said second low-pass filter, having a second input terminal connected to receive the quadrature-phase carrier frequency component, and providing a quadrature-phase double-sideband suppressed-carrier modulated signal at an output terminal.

25. A system as set forth in claim 24 wherein said means for recovering said serial bit stream further comprises:
- a receiving oscillator having an output terminal and having a frequency which is either greater or less than said line carrier oscillator by an amount equal to 1/4T where T is a frequency which is equal to the bit rate of the serial bit stream;
- an analog demodulator having a first input terminal connected to receive said single-sideband signal, having a second input terminal connected to the output terminal of said receiving oscillator and providing a double-sideband signal at an output terminal; and
- a low-pass filter having an input terminal connected to the output terminal of said demodulator for selecting the lower-sideband from the demodulation products so as to provide the voice-band 3-level modified duobinary signal at an output terminal.

26. A system as set forth in claim 25 wherein said means for translating further comprises:
- a full-wave rectifier having an input terminal connected to the output terminal of said low-pass filter, and having an output terminal; and
- a slicer having an input terminal connected to the output terminal of said full-wave rectifier and providing a binary signal at an output.

27. A method of generating a 3-level correlative single-sideband signal from serial binary information having an effective bit rate of K bits per second consisting of the steps of:
- transforming the binary information into separate in-phase and quadrature-phase 2-level correlative signals;

digitally converting said in-phase and said quadrature-phase 2-level correlative signals, respectively, into in-phase and quadrature-phase 3-level correlative signals;

limiting the bandwidth of each 3-level correlative signal to a passband having a bandwidth of about one-fourth of the value of the serial bit rate;

translating the band-limited signals to a line carrier frequency by separately analog modulating in-phase and quadrature-phase frequencies, derived from the line carrier frequency, respectively, with the in-phase and quadrature-phase band limited signals; and summing the resultant products from the in-phase and quadrature-phase band limited signals to obtain a single-sideband signal which is positioned in the frequency spectrum by the line carrier frequency.

28. The method of claim 27, wherein the step of transforming consists of the step of:

encoding the serial bit stream into a 2-level correlated signal, in which the present digit is correlated with the second previous digit.

* * * * *